(12) United States Patent
Deyaf et al.

(10) Patent No.: US 9,925,921 B1
(45) Date of Patent: Mar. 27, 2018

(54) HEAD TRACKING CONTROL SYSTEM FOR CONTROLLING AN AUXILIARY VEHICLE LIGHT

(71) Applicant: Feniex Industries, Inc., Austin, TX (US)

(72) Inventors: Hamza Deyaf, Austin, TX (US); Nicholas Mazzanti, Austin, TX (US); Kyle Hale, Austin, TX (US); Nick Marth, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 15/489,727

(22) Filed: Apr. 17, 2017

(51) Int. Cl.
*B60R 1/00* (2006.01)
*B60Q 1/24* (2006.01)
*H04N 7/18* (2006.01)
*G06T 7/70* (2017.01)

(52) U.S. Cl.
CPC ............... *B60R 1/00* (2013.01); *B60Q 1/245* (2013.01); *G06T 7/70* (2017.01); *H04N 7/183* (2013.01); *B60K 2350/106* (2013.01); *B60K 2350/1076* (2013.01); *B60K 2350/2013* (2013.01); *B60Q 2900/30* (2013.01); *B60R 2300/102* (2013.01); *B60R 2300/80* (2013.01)

(58) Field of Classification Search
None
See application file for complete search history.

(56) References Cited

U.S. PATENT DOCUMENTS

| | | | | |
|---|---|---|---|---|
| 5,729,016 A * | 3/1998 | Klapper | ................... | B60R 1/00 250/332 |
| 5,841,409 A * | 11/1998 | Ishibashi | ............... | G02B 27/017 345/7 |
| 7,923,623 B1 * | 4/2011 | Beaty | ................... | G10H 1/0091 84/701 |
| 8,886,258 B2 * | 11/2014 | Alameh | ................... | H04M 1/05 455/343.1 |
| 2008/0165550 A1 * | 7/2008 | Carmi | ................... | B60Q 1/0483 362/549 |
| 2010/0098394 A1 * | 4/2010 | Ishihara | ............... | G02B 27/646 396/55 |
| 2010/0194556 A1 * | 8/2010 | LaRosa | ................ | B60Q 1/2611 340/471 |
| 2016/0129358 A1 * | 5/2016 | Eversoll | ................. | A63H 30/04 463/40 |
| 2016/0224176 A1 * | 8/2016 | Kim | ....................... | G06F 3/0416 |

FOREIGN PATENT DOCUMENTS

AU 2004100399 A4 * 7/2004

* cited by examiner

*Primary Examiner* — Sathyanaraya V Perungavoor
*Assistant Examiner* — Janese Duley (57) ABSTRACT

A system for controlling an auxiliary vehicle light is described, whereby a wearable controller that may be worn on a user's head or coupled to an article of clothing located on a user's head is useful for transmitting a position and orientation of a user's head to an auxiliary vehicle light located on a surface of a vehicle. The auxiliary vehicle light may include a pivotable body capable of panning, tilting, or rolling. The wearable controller includes sensors to determine an orientation and angular displacement of a user's head. Both the auxiliary vehicle light and the wearable controller includes transceivers for wirelessly communicating with each other.

20 Claims, 7 Drawing Sheets

HEAD TRACKING CONTROL SYSTEM FOR CONTROLLING AN AUXILIARY VEHICLE LIGHT

FIELD OF THE DISCLOSURE

The illustrative embodiments relate generally to a system and method for controlling a direction and orientation of a light source, particularly, a light source coupled to a surface of a vehicle, whereby the light source is configured to track a position and orientation of a user's head and provides light in a direction corresponding to the position and orientation of the user's head.

BACKGROUND

An auxiliary vehicle light is a supplemental light module that may be attachable, either fixedly or removeably, to any surface on an interior or exterior of a vehicle. In one or more embodiments, an auxiliary vehicle light may include one or more light emitting diodes (hereinafter "LED" or "LEDs"). Typically, auxiliary vehicle lights are controlled using one or more controllers that may be mounted or located inside a vehicle. Such controllers may include a user-friendly display interface, having push buttons, knobs, toggles, a touch screen, or other selectors for controlling an output function of the auxiliary vehicle lights. Usually, the controller is fixed to an interior surface of a vehicle. For example, a controller may be fixed on or near a center console or floor console of a vehicle.

Many different types of vehicles, including emergency vehicles, such as police, fire, EMS, and other emergency vehicles, as well as off-road vehicles, and others, utilize auxiliary vehicle lights during nighttime driving and in conditions where visibility may be poor, including during inclement weather and/or in locations with limited natural and artificial lighting. The added illumination provided by the auxiliary vehicle lights may greatly assist to provide increased visibility of a user's surrounding environment.

SUMMARY

In one aspect, embodiments in the present description are provided relating to a system for controlling an auxiliary vehicle light. In an embodiment, an auxiliary vehicle light having a pivotable body capable of pivoting in one or more directions about one or more axes. The auxiliary vehicle light is attachable to a surface of a vehicle. In one embodiment, an auxiliary vehicle light may include a set of motors, a microcontroller, a transceiver, and a set of lights disposed with an interior of the auxiliary vehicle light. In addition, a wearable controller may be, in either wired or wireless communication in one or more embodiments with an auxiliary vehicle light. In one or more embodiments, a wearable controller may be adapted to be coupled to a head of a human wearer or adapted to be coupled to an item worn on the head of the human wearer. Further, a wearable controller may include a set of sensors disposed internally within the wearable controller, whereby the set of sensors are configured to determine an orientation and angular displacement of the head of the human wearer.

A wearable controller may further include a wireless transceiver that wirelessly transmits data signals from the wearable controller to the auxiliary vehicle light regarding the orientation and the angular displacement of the head of the human wearer. Accordingly, in one or more embodiments, the auxiliary vehicle light may be configured to track a position and orientation of the head of the human wearer.

In another aspect, embodiments are provided in the present description that include one or more steps and processes for controlling an auxiliary vehicle light. In one or more embodiments, a process for controlling an auxiliary vehicle light may include detecting a position and orientation of a user's head using a set of sensors located within a user controller, whereby the user controller is worn and located on a head of the user or coupled to an article of clothing or accessory worn on the user's head. A process may further include sending the data regarding the position and orientation of the user's head to the auxiliary vehicle light, whereby the auxiliary vehicle light is coupled to a surface of a vehicle. Upon receiving the data regarding the position and orientation of the user's head, the process may further include rotating all or part of the auxiliary vehicle light to the detected position and orientation. The process may further include providing a light output from the auxiliary vehicle light at the detected position and orientation, which substantially corresponds to a current position and orientation of the user's head.

Other aspects and advantages of innovative embodiments provided in the present description will be apparent from the following description and the appended claims.

DETAILED DESCRIPTION

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. As used herein, the term "coupled" or "coupling" may indicate a connection. The connection may be a direct or an indirection connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . ."

As a preface to the detailed description, it should be noted that, as used in this specification, the singular forms "a", "an", and "the" included plural referents, unless the context clearly dictates otherwise.

The different illustrative embodiments recognize and take into account a number of different considerations. First, it is sometimes necessary or desirable to install one or more auxiliary light devices within a vehicle or on a vehicle. Auxiliary vehicle lights provide additional illumination, brightness, and increased visibility for a vehicle that the driver of the vehicle may need. For example, having one or more auxiliary vehicle lights may be beneficial when driving at night. Also, auxiliary vehicle lights may be beneficial when driving a vehicle in conditions where visibility is poor, such as, for example in inclement weather involving storms, fog, or any additional condition whereby there is inadequate light for driving. In addition, there are many natural environments (e.g. woods, forests, mountainous regions) that do not have an abundance of light available for vehicles driving through these areas, whether at night or during the day. Many vehicles that may drive in such environments having poor natural or artificial lighting may benefit from adding one or more auxiliary vehicle lights to their vehicles to assist with illumination and brightness.

In addition, emergency vehicles, including police, fire, ambulance services, and other private security vehicles, also frequently add auxiliary vehicle lights in order to have increased illumination and greater visibility for their vehicles. The term "auxiliary" as used herein may indicate that the vehicle light is attachable through either removable or non-removable mounting structures and mechanisms to a vehicle. Further, it is noted that auxiliary vehicle lights may be attachable anywhere on an exterior or interior of a vehicle. In one or more embodiments, an auxiliary vehicle light is a supplemental vehicle light. Auxiliary vehicle light as described herein may include all vehicle lights, including aftermarket lights and lights other than OEM lights.

The different illustrative embodiments further recognize that it may be useful and desirable to be able to control both the direction and orientation of light emitted from an auxiliary vehicle light such that the direction and orientation of light emitted from an auxiliary vehicle light corresponds to the line of sight of a user. Accordingly, the different illustrative embodiments recognize that it may be useful and beneficial for the light emitted from an auxiliary vehicle light to "track" or follow the head of a human wearer (e.g. such as, but not limited to, a driver of the vehicle on which an auxiliary vehicle light is located). In other words, the different illustrative embodiments disclosed herein recognize that it may be useful to control the light provided by an auxiliary vehicle light on a vehicle to provide illumination to a location where the human operator needs the light to be directed (i.e. corresponding to the user's line of sight).

In addition, one or more embodiments of a user controller described herein may provide a user with an ability to adjust the brightness and a focus of the auxiliary vehicle light. Further, in one or more embodiments, a user controller described herein may provide an ability to capture multimedia data (e.g. still images and video images) of a user's surroundings.

Further, the different illustrative embodiments recognize that it may be useful and advantageous to provide a wearable controller that is specially adapted to track the movements of the head of the human operator. Thus, a controller in accordance with one or more embodiments as described in the present disclosure may be worn by a user as a headset. Alternatively, a controller in accordance with one or more embodiments of the present disclosure may be attached to one or more articles of clothing or to an accessory worn by a user on his or her head. Such articles of clothing and/or accessories may include, without limitation, a user's glasses, hat, helmet, jewelry, or any other suitable article of clothing or accessory located on one's head (including the ears). Reference will now be made in detail to one or more embodiments described above, examples of which are illustrated in the accompanying drawings.

Figure 1A:
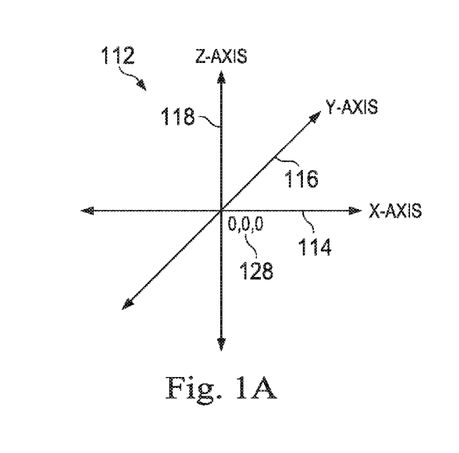
FIG. 1A is an illustration of a grid having an x-axis, a y-axis, and a z-axis in accordance with an illustrative embodiment.
Figure 1B:
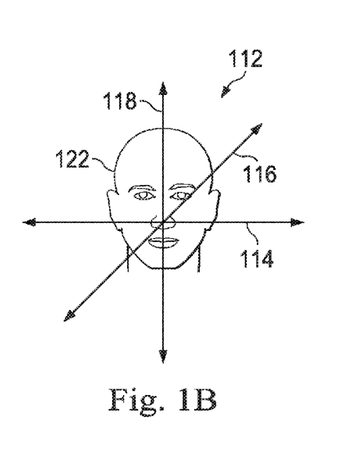
FIG. 1B is an illustration of the grid of FIG. 1A in alignment with a human head in accordance with an illustrative embodiment.
Figure 1C:
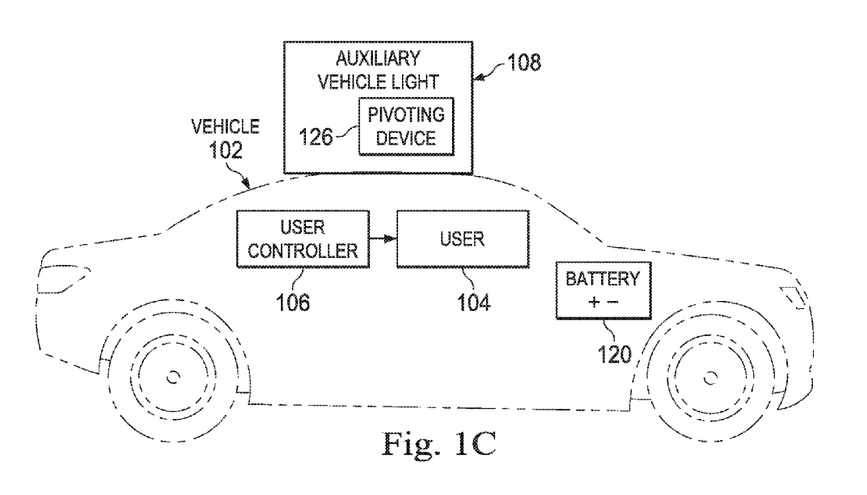
FIG. 1C is an illustration of an auxiliary vehicle light that is configured to pivot on a surface of a vehicle in accordance with an illustrative embodiment.

Referring now to FIG. 1A, FIG. 1A shows an illustration of rid, such as grid 112, having one or more axes. FIG. 1B shows grid 112 superimposed over a user's head, such as head 122. FIG. 1C is a block diagram of a system including a pivotable auxiliary vehicle light in accordance with one or more embodiments of the present disclosure.

Grid 112 in FIG. 1A as an exemplary grid that illustrates three different axes. Grid 112 includes x-axis 114, y-axis 116, and the z-axis 118. Each axis may be perpendicular to the other and intersect at an origin point 128. In one or more embodiments, user controller 106, in FIG. 1C, may be adapted to rotate auxiliary vehicle light 108 about one or more axes (e.g. x-axis 114, y-axis 116, and z-axis 118) of grid 112. User's head 122, as schematically shown in FIG. 1B, may also correlate in terms of direction and orientation to a point along grid 112, including one or more axes, such as x-axis 114, y-axis 116, and the z-axis 118.

FIG. 1C shows an exemplary environment that includes auxiliary vehicle light 108 and a user controller, such as user controller 106, which is used to control the direction and orientation of auxiliary vehicle light 108. As shown in FIG. 1C, auxiliary vehicle light 108 is coupled to a surface (e.g. a roof) of vehicle 102. In accordance with one or more embodiments, auxiliary vehicle light 108 may be adapted to track the position and orientation of a head (e.g. 122) of user 104, using user controller 106, such that the light output emitted from auxiliary vehicle light 108 is directed to the same general area or vicinity that user 104 is looking to at the time. Auxiliary vehicle light 108 may track a movement and orientation of user 104 in real time, i.e. substantially simultaneously with negligible or an insignificant time delay.

In FIG. 1C, vehicle 102 is illustrated as a car. Nevertheless, vehicle 102 may be any type of motor vehicle known to those of ordinary skill in the art including without limitation automobiles, trucks, motorcycles, water craft including, but not limited to, boats, as well as any other type of vehicle known in to those of ordinary skill. In one or more embodiments, vehicle 102 may be an emergency vehicle. An emergency vehicle, as used herein, may be a law enforcement vehicle, a fire department vehicle, an emergency medical vehicle, a public utility vehicle, a tow truck, construction vehicle, or other type of emergency vehicle.

In one or more embodiments, vehicle 102 may be an off-road vehicle. An off-road vehicle is a vehicle particularly suited for driving over unpaved, rough, and uneven terrain. Such off-road vehicles may include, but are not limited to, two-wheeled vehicles, utility vehicles (UTVs and all-terrain vehicles (ATVs). It will be understood that vehicle 102 may be any type of vehicle, without exception, located in any type of setting or environment, including without limitation, urban, rural, desert, beach, forests or woods, and mountainous environments.

Auxiliary vehicle light 108 is a light-emitting module that may be installed and/or mounted on any surface of vehicle 102. In one or more embodiments, auxiliary vehicle light 108 may include a set of light emitting diodes (LED) lights. Alternatively, any other lights other than LED lights as known in the art may also be used in auxiliary vehicle light 108, including without limitation, light bulbs, compact fluorescent light (CFL) bulbs, incandescent light bulbs, and/or fluorescent light bulbs.

It is noted that as used herein, the term "set" may refer to a single item, as well as two or more items. Thus, the set of LED lights may include a single LED light, two LED lights, as well as three or more LED lights. Further, the set of LED lights may include lights of a single uniform color, as well as LED lights of two or more different colors.

Auxiliary vehicle light 108 may be any type of auxiliary vehicle light, such as, but without limitation, an interior light bar, a dash light, a deck light, a visor light, a hideaway light, or any other type of auxiliary vehicle light. Further, auxiliary vehicle light 108 may include a single LED or other source of light, as shown in an exemplary embodiment, auxiliary vehicle light 902.

In one or more embodiments, auxiliary vehicle light 108 may be adjusted to provide a spotlight or flood light. As used herein, a spotlight light may provide a narrow angle of light spread and a flood light may provide light over a wide angle of light spread.

As stated above, auxiliary vehicle light 108 may be coupled to any surface of vehicle 102, including an interior or exterior of vehicle 102. As shown in FIG. 1C, by way of example only, auxiliary vehicle light 108 may be located on a roof of vehicle 102. In other examples, without limitation, auxiliary vehicle light 108 may be located within the passenger compartment of the vehicle on a front or rear dash board of vehicle 102.

Auxiliary vehicle light 108 may be removeably or fixedly coupled to a surface of vehicle 102 using any number of wires, fasteners, mounting structures, adhesives, welding, or any other tools and techniques for attaching a vehicle light as known to those of ordinary skill in the art.

User 104 may be any human wearer and operator of user controller 106. In some circumstances, user 104 may also be a driver of vehicle 102. User controller 106 may be a controller that controls the direction and orientation of auxiliary vehicle light 108 based on the direction and orientation of a head of user 104, e.g. user's head 122. Accordingly, user controller 106 may operate as a head tracking device that synchronizes the movements of auxiliary vehicle light 108 with that of a head (e.g. 122) of a human wearer (e.g. user 104) of user controller 106. As will be further discussed below, in one or more embodiments, user controller 106 includes a wireless transmitting device that may wirelessly communicate a position of a user's head 122, including the horizontal and/or vertical position of a user's head 122 to auxiliary vehicle light 108 so that auxiliary vehicle light 108 is directed at the same angle and position as the user's head 122.

Auxiliary vehicle light 108 may include pivoting device 126. In one or more embodiments, pivoting device 126 may be integrated within a housing of auxiliary vehicle light 108. Alternatively, in other embodiments, pivoting device 126 may be separate from and coupled to auxiliary vehicle light 108. Pivoting device 126 may be configured as a pivotable support mechanism that allows for movability of auxiliary vehicle light 108 in a rotational direction along different axes. As will be further discussed below, in one or more non-limiting embodiments, pivoting device 126 may be one or more controllable gimbals. Other support mechanisms may be used and are contemplated, including any pivoting support mechanism configured to pan, tilt, and/or roll.

In one or more embodiments, auxiliary vehicle light 108 may be capable of panning, tilting, and rolling. Auxiliary vehicle light 108 may be configured to rotate in either a clockwise or counterclockwise direction or both in one or more embodiments. As used herein, panning may be used to describe a rotational movement of auxiliary vehicle light 108 about a vertical axis such as z-axis 118 in FIG. 1A. In one or more embodiments, auxiliary vehicle light 108 may be configured to pan over any range of degrees as desired. In one embodiment, auxiliary vehicle light 108 is configured to pan 360 degrees about z-axis 118. As known in the art, panning may also be referred to as yaw.

Tilting may be used to describe a rotational movement of auxiliary vehicle light 108 over a range of degrees about a horizontal axis, e.g. x-axis 114 with respect to grid 112. Tilting of auxiliary vehicle light 108 may cause auxiliary vehicle light 108 to be angled at an upward or a downward angle. Accordingly, auxiliary vehicle light 108 may be configured to tilt at an upward or downward angle within a particular range of degrees. Tilting may also refer to pitch, as known in the art.

Auxiliary vehicle light 108 may be configured to tilt any number of degrees about a respective axis. In one or more embodiments, auxiliary vehicle light 108 may be configured to tilt 180 degrees about x-axis 114 with respect to grid 112. Accordingly, auxiliary vehicle light 108 may be configured to point in an upward direction if a user 104 is looking up. Effectively, user 104 may look to a location and direct the auxiliary vehicle light 108 to that location as well when user controller is being worn by user 104.

In one or more embodiments, auxiliary vehicle light 108 may be configured to "roll". As used herein, rolling may describe rotational movement of auxiliary vehicle light 108 from side to side. For example, in some embodiments, auxiliary vehicle light 108 may be configured to rotate from side to side, e.g. y-axis 116 with respect to grid 112 shown in FIG. 1A and FIG. 1B. It is noted that in one or more embodiments, auxiliary vehicle light 108 may only be configured to pan and tilt, and not to roll. However, in other embodiments, auxiliary vehicle light 108 may be configured to pan, tilt, and roll, without limitation.

Auxiliary vehicle light 108 may advantageously be moveable and oriented in more than one direction that corresponds to the direction and line of sight of a user, such as user 104. "Line of sight" as used herein may refer to a user's viewpoint and area of observation.

In one or more embodiments, auxiliary vehicle light 108 (as controlled by a controller such as user controller 106) may enable a driver or other person to direct the light emitted therefrom where the light may be most needed or desired. It is foreseeable to one of ordinary skill that there may be many useful applications for one or more embodiments described herein. For emergency personnel, such as without limitation, police, security, fire, EMS responders, etc., it may be useful to direct the light provided by auxiliary vehicle light 108 to a particular location or region of interest for better illumination and visibility. Many other scenarios and applications for auxiliary vehicle light 108 are foreseeable, including, using auxiliary vehicle light 108 for sport, recreational, and entertainment purposes, without limitation. Further, off-road vehicles travel at fast speeds, over rough terrain, and in areas with poor artificial or natural lighting. Drivers and operators of off-road vehicles may also benefit from having auxiliary vehicle light 108 coupled to the vehicle. Notably, auxiliary vehicle light 108 may usefully track a position and orientation of user 104's head while vehicle 102 is in motion (e.g. being driven) or while vehicle 102 is parked and stationary.

In one or more embodiments, user 104 may advantageously be able to operate auxiliary vehicle light 108 without even having to be located within vehicle 102. Accordingly, user controller 106 may be configured to provide "remote" control of auxiliary vehicle light 108. For example, in an embodiment where user controller 106 is wirelessly connected to auxiliary vehicle light 108 (as further described below and shown in FIG. 4), user 104 may be outside of the interior confines of vehicle 102 and still control the orientation and direction of auxiliary vehicle light 108. Under such circumstances, vehicle 102 is most likely parked or stationary while user 104 moves within a maximum operating range or distance from vehicle 102. It is contemplated that other situations may arise whereby user 104 is not located within vehicle 102 and vehicle 102 may be also be in motion. As long as vehicle 102 remains within the maximum operating range or distance to receive signal communication from user controller 106, user 104 (while wearing user controller 106) may still control a direction and orientation of auxiliary vehicle light 108 while vehicle 102 is moving even if user 104 is not located within vehicle 102.

This ability to control auxiliary vehicle light 108 using a wearable, wirelessly enabled user controller 106 may assist in several applications. Many professions may benefit from one or more of the functions provided by embodiments of auxiliary vehicle light 108, including, but not limited to, police, law enforcement, fire, EMS, public utility, construction, and other maintenance/repair providers. Advantageously, using one or more embodiments of user controller 106, user 104 is able to shine the light originating from auxiliary vehicle 108 to a region of interest, whether vehicle 102 is stationary or mobile, and even if the user 104 wearing user controller 106 is not located within vehicle 102.

By way of example only, it may be useful to have an auxiliary vehicle light 108 that is able to track user 104 as he or she moves around vehicle 102 in locations having limited artificial or natural lighting such as, but not limited to, areas with dense foliage such as woods or forests, rural, and/or other remote settings. Additionally, user 104 may benefit from the illumination, and particularly, the multi-directionality of the illumination of auxiliary vehicle light 108 when user 104 has need of repairing or performing maintenance on vehicle 102 at night or during conditions where visibility is poor.

Further non-limiting examples where auxiliary vehicle light 108 may be useful include occasions where vehicle 102 may be parked near a site used for recreational activities, such as camping, sporting events, picnic sites, parks, or the like.

In one or more embodiments, auxiliary vehicle light 108 may be connected (e.g. via one or more wires and connectors) to vehicle battery 120, which may be used to supply power in the form of electric current to auxiliary vehicle light 108. Alternatively, other power sources may be used, as known to those of ordinary skill in the art, including any type of battery that may be located within auxiliary vehicle light 108. User controller 106 may also include a power source, as further described below and shown in FIG. 4.

Figure 2:
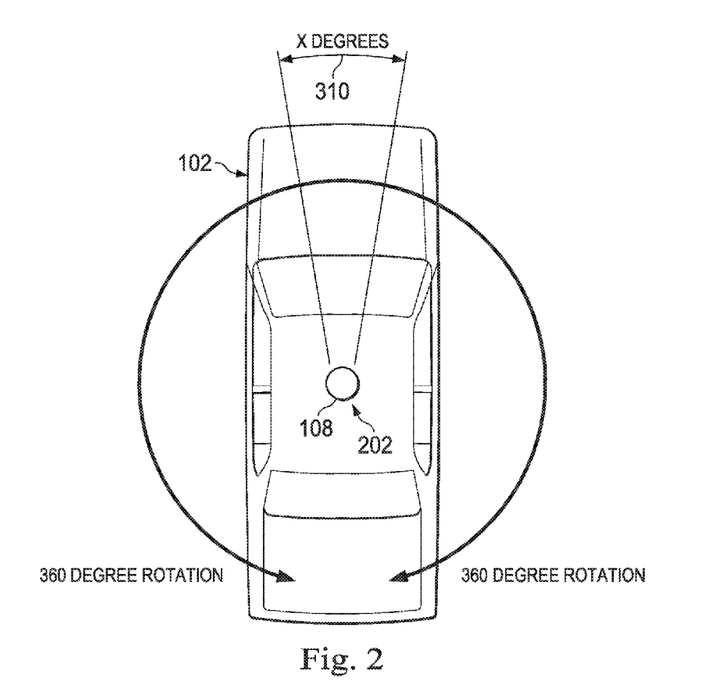
FIG. 2 is a top perspective view of a vehicle having an auxiliary vehicle light in accordance with an illustrative embodiment.

Referring to FIG. 2, FIG. 2 is an exemplary illustration of a top view of a vehicle having an auxiliary vehicle light disposed on an outer surface of the vehicle in accordance with an illustrative embodiment. In FIG. 2, auxiliary vehicle light 108 is depicted as located on a roof of vehicle 102. In one or more embodiments, auxiliary vehicle light 108 may be permanently mounted or fixed to a roof (or another surface) of vehicle 102. Alternatively, auxiliary vehicle light 108 may be removeably mounted or removeably coupled to a surface of vehicle 102.

In one or more embodiments, a user controller that tracks the head movements of a user, e.g. user controller 106 as shown in FIG. 1C, may be used to control a direction and orientation of auxiliary vehicle light 108 in FIG. 2.

As shown in FIG. 2 with reference to the illustrated 360-degree rotational arrow, auxiliary vehicle light 108 may be configured to pan, i.e. rotate about a vertical axis. In one or more embodiments, auxiliary vehicle light 108 may rotate 360 degrees in either direction from a starting point and/or default position such as default position 202 shown in FIG. 2. In one or more embodiments, default position 202 of auxiliary vehicle light 102 may indicate an original position and orientation, i.e. starting position for auxiliary vehicle light 108. Further, default position 202 may be the return position that auxiliary vehicle light 108 returns to after user controller 106 is powered off or if signal communication happens to fail with user controller 106. In addition, in one or more embodiments, user controller 106 may be configured to include a selector or input device (e.g. button, switch, or the like including center reset 474 in FIG. 4) that, when selected by user 104, acts to restore auxiliary vehicle light to default position 202.

As shown in FIG. 2, in a non-limiting example, default position 202 may indicate that auxiliary vehicle light 108 is forward facing, centered, and level so as not to be tilted either in an upward or downward direction. Other circumstances are foreseeable whereby auxiliary vehicle light 108 may be originally positioned so as tilt either up or down, and thus default position 202 may correspond to an original position and orientation of auxiliary vehicle light 108 whereby auxiliary vehicle light 108 is tilted but not necessarily level.

Figure 3:
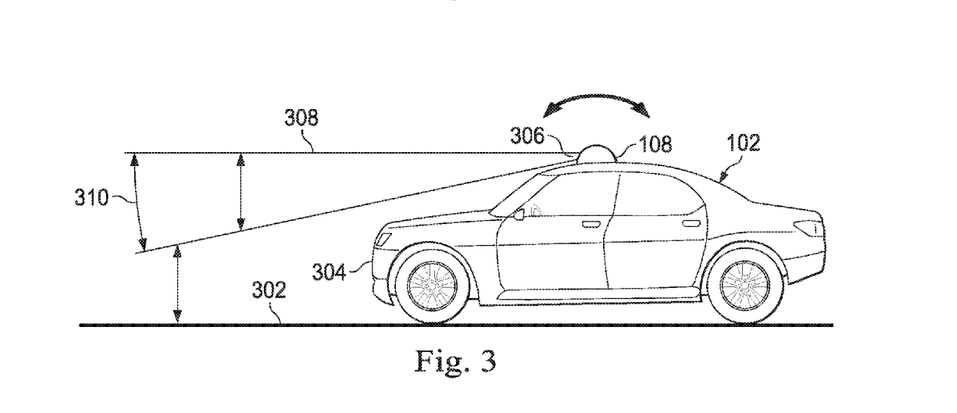
FIG. 3 is an illustration of side view of a vehicle having an auxiliary vehicle light disposed on an outer surface of the vehicle in accordance with an illustrative embodiment.

Referring to FIG. 3, FIG. 3 is an illustration of side view of a vehicle having an auxiliary vehicle light disposed on an outer surface of the vehicle in accordance with an illustrative embodiment. In one or more embodiments, auxiliary vehicle light 108 may be configured to move and orient in a particular direction as described above with respect to auxiliary vehicle light 108. Further, in one or more embodiments, based on the location of auxiliary vehicle light 108, it may be advantageous to limit the direction of tilt for auxiliary vehicle light 108 in a downward direction. As shown in FIG. 3, a front portion 304 of vehicle 102 may obstruct light output 306 emitted from auxiliary vehicle light 108 if auxiliary vehicle light 108 is tilted too far downward. Accordingly, in order to maximize the visibility provided by the light output 306, it may be beneficial to set a range of degrees 310 that auxiliary vehicle light 108 may tilt in a downward direction. Light output 306 may be oriented to shine to a lowermost elevation point, i.e. ground level 302 without contacting or being blocked by a front 304 of vehicle 102.

In one or more embodiments, auxiliary vehicle light 108 may be configured to tilt downward to a maximum angle 310 from a reference horizontal line 308. For example, auxiliary vehicle light 108 may be configured to tilt to a maximum angle of 5 degrees from a normal horizontal line 308. In other embodiments, auxiliary vehicle light 108 may be configured to tilt to a maximum angle of 10 degrees from a normal horizontal line 308.

It is noted that auxiliary vehicle light 108 may be configured to tilt in either an upward or downward direction without restriction as to a maximum angle of tilt. Auxiliary vehicle light 102 may be disposed at any location either on an exterior or interior of vehicle 102. Thus, it may be beneficial to provide for a full range of tilting, including up to 180 degrees or more to suit the various locations that auxiliary vehicle light 108 may be located on or within a vehicle such as vehicle 102.

Figure 4:
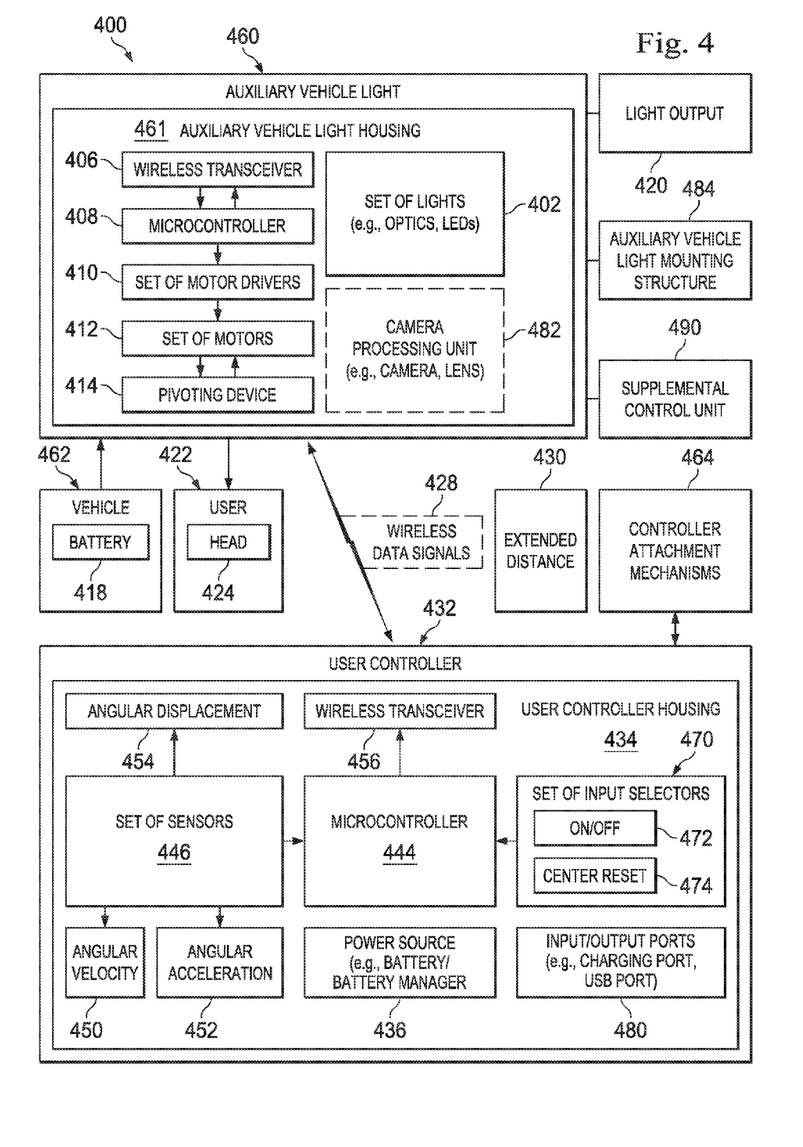
FIG. 4 is a block diagram of a system for controlling an auxiliary vehicle light coupled to a vehicle using a wearable, head tracking controller in accordance with an illustrative embodiment.

Referring to FIG. 4, FIG. 4 is a block diagram of a system, such as system 400, for controlling an auxiliary vehicle light, such as auxiliary vehicle light 108, using a wearable, head tracking controller (e.g. user controller 106) in accordance with one or more embodiments described herein.

In one or more embodiments, system 400 is a system for controlling an orientation and direction of light output 420 emitted from auxiliary vehicle light 460. Auxiliary vehicle light 460 may be configured and operate as auxiliary vehicle light 108 as described above. In one or more embodiments, a base of auxiliary vehicle light 460 may be coupled (e.g. removeably or fixedly) to any surface of vehicle 462, although other portions of auxiliary vehicle light 460 may also be coupled to a surface of vehicle 462. Further, vehicle 462 may be in accordance with vehicle 102 as described above and as shown in FIG. 1C-FIG. 3.

Auxiliary vehicle light 460 may be of any desired shape or size, and may be made of any suitable material, including, but not limited to, any type of plastic, metal, glass, or combination thereof.

Auxiliary vehicle light housing 461 may form the outer structure of auxiliary vehicle light 460. Auxiliary vehicle light 460 may include a housing 461 that is adapted to house the operative elements of auxiliary vehicle light 460 and may have various configurations and designs depending on the elements included therein.

User controller 432 may be a wearable controller that controls a position and orientation of a light emitting module, such as auxiliary vehicle light 460. User controller 432 may be a controller such as user controller 106 shown in FIG. 1C and as described above. User controller 432 may include a number of electric or electronic components for controlling a direction and orientation of auxiliary vehicle light 460.

Figure 5:
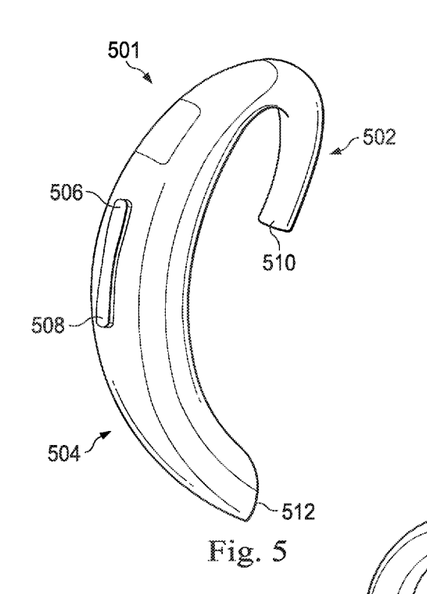
FIG. 5 is an illustration of an exemplary headset that may be worn over an outer ear of a user and is adapted to operate as a head tracking controller for an auxiliary vehicle light in accordance with an illustrative embodiment.

In one or more embodiments, user controller 432 is configured as a headset that may be coupled to a head of an associated user (e.g. user's head 424). In one exemplary, non-limiting embodiment, user controller 432 may be a headset adapted to fit over an outer ear of user 424, and may include one or more elements for additional stability and placement on an ear of user 422. FIG. 5 depicts an exemplary wearable controller 501 in accordance with one or more embodiments.

In other embodiments, user controller 432 may be attached to an article of clothing, such as, but not limited to, a hat or helmet, that may be worn on user's head 424. Alternatively, user controller 432 may be configured to attach (e.g. removeably) to another item worn on a user's head 424, including one or more accessories. One such accessory may be any type of glasses worn by user 422, including, without limitation, prescription vision glasses or sunglasses. Other articles of clothing and accessories (e.g. jewelry) that may be worn on user's head 424 may also be used to affix user controller 432.

Controller attachment mechanisms 464 may be one or more mechanisms that assist in firmly locating and placing user controller 432 in a desired location on user's head 424. By way of example, controller attachment mechanisms 464 may include one or more clips to clip user controller 432 to an article of clothing or accessory worn on user's head 424. In addition, controller attachment mechanisms 464 may include straps, cables, hooks, and/or earbuds. Other attachment mechanisms known in the art or as yet to be developed may be used as these examples are not meant to be limiting.

In one or more embodiments, controller attachment mechanisms 464 may provide means for removeably coupling controller 432 to a user's head 424. Alternatively, in other embodiments, user controller 432 may be fixedly coupled (i.e. non-removeably) to an article of clothing, such as a hat or helmet, or another item, such as a pair of glasses. In such an embodiment, user 422 may simply wear the article of clothing or other item whereby user controller 432 is already fixed to the article of clothing or other items.

In one embodiment, housing 434 is adapted to be worn as a head set on one or more ears of the user 422. As used herein, the term "head set" may describe user controller 432 that is positioned on a user's head, including, but not limited to, being located on a user's ear.

In one or more embodiments, user controller 432 may be a head set whose overall shape is curvilinear so as to fit over a user's ear. FIG. 5 shows an exemplary, non-limiting embodiment of such a user controller 432 adapted to fit over an ear of user 422.

In one or more embodiments, user controller 432 may also be a head set that that fits within and/or over a user's ear by using a hook coupled to a body of user controller 432, whereby the hook may hook over an outer ear of user 422. Ear buds may also be included with user controller 432.

In one or more embodiments, user controller 432 may include one or more straps or cables (not shown) that connect a portion of user controller 432 to either user's head 424 and/or one or more of the user's ears 426.

User's controller 432 may be configured to be relatively light-weight and compact so as to be easily put on or in a user's ear or worn on a user's head 424. Further, user controller 432 may be configured to be easily stored without taking up too much space since user controller 432 may be smaller in size and may be stored when not in use.

The above-mentioned clips, handles/hooks, ear buds, cables, and other controller attachment mechanisms 464 may be used in one or more embodiments so as to position user controller 432 adjacent or proximate to user's head 424, ultimately, in order to track the movements, i.e. direction and orientation of user's head 424 using one or more sensors 446 located within user controller 432.

Set of sensors 446 may include one or more sensors that may be used to determine a position and obtain measurements that define a position and orientation of user's head 424. The term "set" as used herein describes one or more items. Accordingly, set of sensors 446 may include one sensor, two sensors, three sensors, or any number of sensors to calculate and determine a position of user's head 424.

Further, in one or more embodiments, set of sensors 446 may be individual sensors or may be combined on one or more sensor modules that are operatively enabled within an interior structure of the housing 434 of user controller 432.

Set of sensors 446 may detect and obtain one or more measurements that may be used to determine the location and orientation of user's head 424. Such measurements may include, without limitation, an angular velocity 450, an angular acceleration 452, and an angular displacement 454 of user's head 424. Other measurements and calculations may be obtained using set of sensors 446 or other devices.

Set of sensors 446 may be configured to sense displacement and position of user's head 424 along one, two, or three axes, including a horizontal and vertical axis that corresponds to a horizontal and vertical axis aligned with a user's head 422 (e.g. grid 112 as shown in FIG. 1A and FIG. 1B).

Set of sensors 446 may be any suitable sensors known in the art without limitation. One or more sensors of set of sensors 446 may be described as an angular position sensor. As known in the art, an angular position sensor (also referred to as a rotary sensor) measures the relation by which any position with respect to any other position is established. An angular position sensor calculates the orientation of an object with respect to a specified reference position s expressed by the amount of rotation necessary to change from one orientation to the other about a specified axis. Any suitable angular position sensor known in the art may be used in in user controller 432. A number of different parameters may be factored in when selecting set of sensors 446 in user controller 432, including without limitation, supply voltage, output type, sensing range, operating temperature range, packaging type and supply current. Further, one or more accelerometers (not shown), gyroscopes (not shown), or other device may be utilized to with user controller 432 to determine the position and orientation of user's head 424.

In this manner, set of sensors 446 may measure and determine a location and orientation of user controller 432, because set of sensors 446 may be located within a housing 434 of user controller 432. As previously mentioned, because user controller 424 may be adapted to be worn on a user's head 422, such as being coupled to one or more of user's ears or connected to another it m worn on a head 424 of user 422, user controller 424 is also enabled to measure and determine a location and orientation of user's head 424 by virtue of the placement of user controller 424.

In one or more embodiments, user controller 432 may include a microcontroller, such as microcontroller 444. Set of sensors 446 may be connected to microcontroller 444, and provide any data acquired regarding a position and orientation of set of sensors 446 to microcontroller 444. Microcontroller 444 may be any type of microcontroller known to those of ordinary skill in the art. Microcontroller 444 may be a self-contained system with peripherals, memory and a processor that may be used as an embedded system within user controller 432. Microcontroller 444 handles the control data from set of sensors 446, as well as from set of input selectors 470, input/output ports 480, and other elements of user controller 432. Microcontroller 444 may be any chip or electronic board suitable for processing such data, e.g., in digital data. Microcontroller 444 may be programmable and may be configured to include one or more input and output devices. Set of sensors 446 may be configured to supply the sensing data obtained with set of sensors 446 to microcontroller 444. Microcontroller 444 may be selected based on several parameters including bits, flash size, RAM size, number of input/output lines, packaging type, supply voltage and speed, amongst others.

In one or more embodiments, user controller 432 includes a wireless transceiver 456. In other embodiments, instead of a wireless transceiver, a wireless transmitter may be utilized. As known in the art, a transceiver is a device comprising both a transmitter and a receiver which are combined and share common circuitry or a single housing. Thus, a wireless transceiver is enabled to both transmit and receive wireless data signals (e.g. wireless data signals 428) depending on which state is selected. Accordingly, in one or more embodiments, wireless transceiver 456 (or alternatively a wireless transmitter) may be a device for wirelessly transmitting data signals from user controller 432 to wireless transceiver 406 (or alternatively a wireless receiver) in auxiliary vehicle light 460. Wireless transceiver/transmitter 456 may be, without limitation, a Bluetooth® device, an infrared device, or a wireless local area network device, such as a Wi-Fi device.

Thus, wireless transceiver/transmitter 456 may be enabled to transmit one or more wireless data signals 428 over an extended distance 430 to auxiliary vehicle light 460. The length of extended distance 430 over which wireless data signal 428 may be transmitted may depend on the type of wireless transceiver/transmitter 456 used in user controller 432. By way of example, Bluetooth® is known in the art as short range wireless technology standard for exchanging data over relatively short distances (using short-wavelength UHF radio waves in the ISM band from 2.4 to 2.485 GHz). However, alternative types of wireless devices may be used without limitation that allow for relatively longer distances. Wireless data signals 428 may include d processed by microcontroller 444 regarding an angular displacement 454, angular velocity 450, and angular acceleration 452 of user's head as obtained as data by set of sensors 446.

In one or more embodiments, user controller 432 may be utilized while a driver or another human wearer (e.g. user 422) may be located within vehicle 462. Nevertheless, in one or more embodiments, user 422 may be able to wear user controller 432 when user 422 is not necessarily located within the confines of vehicle 462. Thus, if auxiliary vehicle light 460 is activated or powered on, user 422 may still be able to direct and orient the light output from auxiliary vehicle light 460 from outside of vehicle 462. Accordingly, wireless transmitter/transceiver 456 may be enabled to transmit data signals over extended distance 430, whereby extended distance 430 includes distances away from the interior or exterior of vehicle 462.

Alternatively, in one or more embodiments, user controller 432 may include a wired (not shown) connection to auxiliary vehicle light 460 that transmits data signals directly to auxiliary vehicle light 460. It is foreseeable that in some instances, auxiliary vehicle light 460 may be a light module located within an interior of vehicle 462, whereby it may be easier to facilitate a wired connection between user controller 432 located on user's head 424 and such a light module.

In addition to the above, user controller 432 may include a power source 436. Power source 436 may provide a power supply that powers user controller 432 order to activate and deactivate (e.g. power on and off) user controller 432. In one or more embodiments, power source 436 may include any suitable battery known by those of ordinary skill in the art. A battery manager may also be included in user controller 432 for controlling an integrated battery.

In one or more embodiments, battery included as power source 436 may be a primary battery as known in the art which may be a single use, disposable battery that is removed upon expiration and replaced with another battery after an initial period of use. Alternatively, battery included as power source 436 may be rechargeable. Accordingly, in one or more embodiments, user controller 432 may include one or more input/output ports 480 that provide ports for various functions, including a charging port for charging an integrated battery in user controller 432. Further, in one or more embodiments, user controller 432 may further include a universal serial bus (USB) port that may be used to upload data to user controller 432.

Various input selectors 470 may be located on a housing 434 of user controller 432. Such input selectors 470 may include any type of selector known in the art for a user to provide user input 440, and may include, without limitation, buttons, toggles, slides, and/or switches. Further, other user interfaces may be located on an exterior of user controller housing 434, as desired, such as any type of user interface that permits a user to select or enter the desired user input 440 into the user controller 432, such as a graphical user interface, a touch screen, a keyboard, or any other type of user interface. In one or more embodiments, an on/off selector 472 may be included with user controller 432 for powering on and off user controller 432.

Further, a center reset selector 474 may be included with user controller 432. Center reset selector 474 may enable the user controller 432 to be restored to a default position such as default position 202 as described above with respect to FIG. 2. In one or more embodiments, a default position may mean that auxiliary vehicle light 460 is centered and leveled to an original starting position (e.g. without any displacement). Alternatively, in some instances, which may depend on how auxiliary vehicle light 460 is initially mounted and oriented, a default position may mean that auxiliary vehicle light 460 is centered, but is also initially tilted at an angle. In one or more embodiments, user 422 may determine the associated position and orientation of auxiliary vehicle light 460 in a default position.

Vehicle 462 may include a vehicle battery 418, which may function to provide power via electric current to one or more electrical devices located within a vehicle. In addition, auxiliary vehicle light 460 may be coupled to vehicle battery 418 via one or more wires (not shown) for transmitting power to auxiliary vehicle light 460. Alternatively, in other embodiments, alternative power sources (e.g. batteries) may be integrated within auxiliary vehicle light 460 and provide power therein.

Auxiliary vehicle light 460 may include a set of lights 402. Set of lights 402 may be configured as a set of LEDs in one or more embodiments, although other light sources may be used without limitation. Thus, auxiliary vehicle light 460 may provide illumination or light in the form of light output 420 upon activation. Those of ordinary skill will appreciate that other components may be used to operate set of lights 402 in auxiliary vehicle light 460. For example, set of lights 402 may include one or more optics or lenses specially adapted for placement and operation in auxiliary vehicle light 460. Further, an outer transparent covering or panel made of any suitable material (e.g. plastic) may cover one or more lights of set of lights 402.

In one or more embodiments, light output 420 may refer to the light provided by auxiliary vehicle light 460. In one or more embodiments, a brightness of light output 420 may also be controlled using user controller 432. Accordingly, in one or more embodiments, one or more selectors of input selectors 470 located on user controller 432 may be used to either enhance or dim the brightness of light output 420.

In addition to the above, in one or more embodiments, it may be feasible to adjust the light spread (or light output 420) produced by set of lights 402, such that the set of lights 420 may operate as either a spotlight or a flood light. In such an embodiment, light output 420 is capable of ranging from a narrow light spread (as provided by a spotlight) to a wide light spread (as provided by a floodlight) depending on a position of set of lights 420 with respect to one or more optics located within auxiliary vehicle light 460. One or more methods and embodiments for adjusting light spread of set of lights 402 may be found in U.S. Pat. Nos. 9,423,090 and 9,423,092, which are assigned to the present assignee and are incorporated herein in their entirety.

Auxiliary vehicle light 460 may include a wireless receiver or transceiver 406 which is configured to receive wireless data signals 428 transmitted from wireless transmitter or transceiver 456 located in user controller 432.

Further, auxiliary vehicle light 460 may include a microcontroller 408. Microcontroller 408 may be any suitable microcontroller known in the art. Microcontroller 408 may be any chip or electronic board suitable for processing digital data. Microcontroller 408 may process and communicate one or more data signals, including wireless data signals 428 regarding a direction and orientation of user's head 424 to a set of motor drivers 410. In such an embodiment, microcontroller 408 may provide the necessary signals to actuate set of motors 412 included in auxiliary vehicle light 460. Set of motors 412 may be any suitable motors known in the art, without limitation.

In one or more embodiments, signals provided from microcontroller 408 to set of motor drivers 410 may provide the necessary signals to actuate the set of motors 412 that are coupled to pivoting device 414. In one or more non-limiting embodiments, proportional-integral-derivative (PID) loops are executed on microcontroller 408, although other control systems that may be implemented on microcontroller 408 may be used as known in the art. A proportional-integral-derivative controller (PID controller) is a control loop feedback mechanism (controller) commonly used in industrial control systems. A PID controller, such as a microcontroller, may continuously calculate an error value as the difference between a desired set point and a measured process variable. Using PID loops in one or more embodiments may enable pivoting device 414 to pan, tilt, or roll in a smooth and controlled manner.

Pivoting device 414 may be configured and operated as described above with respect to pivoting device 126 shown in FIG. 1G. In one or more embodiments, pivoting device 414 may be at least one gimbal (e.g. or two or three gimbals) used to rotate and position auxiliary vehicle light 460. A gimbal, as known by one of ordinary skill, may be a pivotable support system that allows the rotation of an object about an axis. In one or more embodiments, pivoting device 414 may include at least one gimbal that provides rotation on an orthogonal pivot axis. Further, pivoting device 414 may allow for rotational movement about one or more axes, such as, for example purposes only, x-axis 114, y-axis 116, and z-axis 118 shown in grid 112 shown in FIGS. 1A and 1B. In one or more embodiments, pivoting device 414 may provide rotation about a single axis (e.g. x, y, or z axis) or a combination thereof.

As used herein, panning may refer to a rotation about a vertical axis, such as a z-axis. Pitch (also known as tilting) may refer to a rotation about an x-axis (e.g. see grid 112 in FIGS. 1A and 1B). Roll may refer to a rotational movement of auxiliary vehicle light 460 about a y-axis.

Pivoting device 414 include any number of linkages that link pivoting device 414 to a base within auxiliary vehicle light 461 to manipulate a direction and orientation of auxiliary vehicle light 460 Further, pivoting device 414 is not limited to a gimbal mechanism, as alternative support systems known in the art may be used. In one non-limiting, exemplary embodiment, pivoting device 414 may be formed as one or more support arms coupled to one or more hinges or brackets that may be manipulated through mechanical or automatic means. Pivoting device 414 may be integrated within housing 461 of auxiliary vehicle light 460. Alternatively, or additionally, pivoting device 414, including any number of gimbals and/or motors, may be located outside of auxiliary vehicle light housing 461, and thus may be coupled to auxiliary vehicle light 460.

In one or more embodiments, auxiliary vehicle light 460 may be mounted to any surface of vehicle 462 using mounting structure 484. Mounting structure 484 may include a set of supports that may be used to attach auxiliary vehicle light 462 to vehicle 464. In one or more embodiments, mounting structure 484 may be any suitable bracket known in the art. Further, a number of arm members and connector pieces may be employed to mount auxiliary vehicle light 460 using mounting structure 484. It will be understood by those of ordinary skill in the art that mounting structure 484 does not impede the movement of pivoting device 414 or set of motors 412. Rather, mounting structure 484, in one or more embodiments, may allow one or more surfaces of auxiliary vehicle light 460 to be mounted to a surface of vehicle 462 and also to rotate about one or more axes, such as an x axis, y-axis, or z-axis. Accordingly, in one or more embodiments, mounting structure 484 may locate all or a part of auxiliary vehicle light 460 some distance or height above a surface of vehicle 462 such that there is a gap between bottom surface of auxiliary vehicle light 460 and a surface of vehicle 462. In such an embodiment, auxiliary vehicle light 460 may be able to tilt at an upward or downward angle. Further, there may be a maximum tilt angle reached by auxiliary vehicle light 460 as limited by the boundaries resulting from the physical structure of mounting structure 484.

In one or more embodiments, auxiliary vehicle light 460 may further be used to capture multimedia data (e.g. pictures and/or video) of user 422's surroundings. Accordingly, in one or more embodiments, a camera processing unit, such as cameral processing unit 482 may be disposed within auxiliary vehicle light 460. Camera processing unit 482 may include any suitable camera having image recording, including video recording capabilities. In one or more embodiments, multimedia data obtained by camera processing unit 482 may be transmitted and provided as a live feed for user 422 to view on one or more display user interfaces.

In one or more embodiments, a user display interface (e.g. screen) may be located within vehicle 462 and dedicated to receiving multimedia data from auxiliary vehicle light 460. Alternatively, in other embodiments, multimedia data obtained by camera processing unit 482 may be transmitted to any computer, touch pad, smart phone mobile device, or other electronic device having a user display interface that may be accessible by user 422. User controller 432 may include one or more selectors (e.g. input selectors 470) that triggers activation of camera processing unit 482.

As stated above, user controller 432 may be configured to orient a position of auxiliary vehicle light 460, as well as to adjust a brightness (e.g. dim or enhance) of light output 420 of auxiliary vehicle light 460. Further, user controller 432 may be used to activate a camera processing unit integrated in auxiliary vehicle light 460, such as cameral processing unit 482.

Further, in one or more embodiments, a GPS receiver (not shown) may be included within user controller 432 to enable for GPS triangulation to occur. As known to those of ordinary skill, triangulation may utilize trilateration as a method of determining the relative positions of objects using the geometry of triangles. Thus, a GPS receiver included within user controller 432 may assist in determining a relative position of user controller 432 with respect to vehicle 462.

In one or more embodiments, alternate control units, such as supplemental control unit 490 may be used to control other functions of auxiliary vehicle light 460. In one or more embodiments, supplemental control unit 490 may be used to activate or deactivate auxiliary vehicle light 460. Alternatively, activation and deactivation of auxiliary vehicle light 460 may be accomplished using user controller 432.

Accordingly, one or more embodiments of auxiliary vehicle light 460 and user controller 432 may be used according to one or more methods provided below. In one or more embodiments, a user, such as user 422 may locate user controller 432 on user's head 424. In one or more embodiments, user controller 432 may be worn as a headset hooked one or both of user 422's ears, in which case user 422 positions the headset as needed using one or more controller attachment mechanisms 464 to couple such a user controller 432 to his or her ears or head 424. In other embodiments, user controller 432 may be coupled to an item worn on a user's head 424 (e.g. hat, helmet, glasses, jewelry), whereby that item may be worn by user 422 on user's head 424. It is meant that user controller 432 may be worn comfortably and without interfering with a user's 422 vision or line of sight. User controller 432 may also be lightweight and compact so as not to take up an excessive amount of space and inconvenience the natural movement of user's head 424. In one or more embodiments, powering on user controller 432 may include selecting a power on/off selector 474 located on user controller 432.

To power on and off auxiliary vehicle light 460, a couple of different methods may be used. In one or more embodiment, powering on a vehicle, such as vehicle 462 may automatically power on auxiliary vehicle light 460. Alternatively, in one or more embodiments, auxiliary vehicle light 460 may be powered on using a supplemental control unit 490 mounted in vehicle 462. In yet another embodiment, there may be a selector such as input selector 470 located on user controller 432 that enables powering on and off auxiliary vehicle light 460. Upon powering on auxiliary vehicle light 460 (e.g. using any of the above), light output 420 may be emitted from auxiliary vehicle light 460, whereby a set of light beams are automatically projected from auxiliary vehicle light 460.

Once user controller 432 is powered on, a set of sensors 446 may be activated to transmit a position and orientation of user's head 424. In one or more embodiments, user 422 may select one or more selectors 470 located on user controller 432 that adjust a brightness of light output 420 emitted from auxiliary vehicle light 460 to a user's satisfaction. Accordingly, user 422 may dim or enhance light output 420 if the light output 420 initially emitted by auxiliary vehicle light 460 is unsatisfactory to the user.

Upon initially receiving a wireless data signal 428 from user controller 432, auxiliary vehicle light 460 may be in a default position, such as default position 202 in FIG. 2, which may be a same position that auxiliary vehicle light 460 may be restored to as needed.

In one or more embodiments, a camera processing unit 482 may be integrated within auxiliary vehicle light 460. In one or more embodiments, one of the input selectors 470 may be selected to activate multimedia recording using camera processing unit 482. In some embodiments, a graphical user interface may be located within view of a user 422 (e.g. located within vehicle 462) and user 422 may have a real-time view of his or her environment.

In one or more embodiments, a selector from a set of input selectors 470 may be selected to adjust a focus of light output 420, such that light out 420 may have a narrow angle of light spread (e.g. a spotlight) or light output may have a wider angle of light spread (e.g. a flood light).

User 422 may selectively adjust light output 420 and/or enable live feed from camera processing unit 482 prior to commencing driving of vehicle 462, e.g. when vehicle 462 is parked or stationary. Alternatively, in one or more embodiments, user 422 may selectively adjust light output 420 and/or enable live feed from camera processing unit 482 while vehicle 462 is operated in motion (e.g. being driven).

To pan auxiliary vehicle light 460 in one or more directions, user 422 may turn user's head 424 towards a left or right direction. Set of sensors 446 disposed within user controller 432 may detect the displacement of user's head 424 and communicate (e.g. wirelessly using wireless transceiver 456 in user controller 432) the coordinates of user's head 424 to microcontroller 408 located within a housing 461 of auxiliary vehicle light 460. Upon receiving the coordinates of user's head 424 (e.g. indicating a displacement or change in position), microcontroller 408 in one or more embodiments may send instructions to one or more motor drivers 410 to actuate one or more motors 412 coupled to pivoting device 414.

Pivoting device 414 may then initiate panning or rotating about a z-axis auxiliary vehicle light 460. Upon panning auxiliary vehicle light 460, light output 420 is directed to a same location that user 422 is looking. In one or more embodiments, auxiliary vehicle light 460 may pan in virtually any direction, including over a 360-degree range or a full circle.

To tilt auxiliary vehicle light 460, user 422 may tilt user's head 424 at an upward or downward angle. Set of sensors 446 may detect a change in position of user's head 424 upon tilting and communicate the changed coordinates of user's head 424 to microcontroller 408 in auxiliary vehicle light 460. Upon receiving the coordinates of user's head 424 (e.g. indicating a displacement or change in position), microcontroller 408 in one or more embodiments may send instructions to one or more motor drivers 410 to actuate one or more motors 412 coupled to pivoting device 414. Pivoting device 414 may then initiate tilting of auxiliary vehicle light 460. Upon tilting auxiliary vehicle light 460, light output 420 is directed to a same location that user 422 is looking.

In one or more embodiments, auxiliary vehicle light 460 may tilt over a 180-degree range. In other embodiments, it may be advantageous to limit the direction of tilt for auxiliary vehicle light 460 in a downward direction. As shown in FIG. 3 and described above, a front or back portion of a vehicle, such as vehicle 462 may obstruct light output 420 emitted from auxiliary vehicle light 460 if auxiliary vehicle light 460 is tilted too far downward. Accordingly, there may be a maximum tilt angle programmed into auxiliary vehicle light 460 (e.g. using microcontroller 408) beyond which auxiliary vehicle light 460 may not tilt.

In one or more embodiments, set of motors 410 may also be actuated to cause pivoting device 414 to roll from side to side if user 422 turns user's head 424 from side to side. Although, in some embodiments, auxiliary vehicle light 460 may be limited to panning and tilting only.

According to one or more embodiments, wireless transceiver or transmitted. 456 may be integrated within user controller 432 and may be coupled to send wireless data signals 428 to wireless transceiver or receiver 406 in auxiliary vehicle light 460. As long as user 422 remains within an operating range of distance from vehicle 462, and specifically from wireless transceiver or receiver 406 in auxiliary vehicle light 460, user 422 may control a direction and orientation of light output 420 of auxiliary vehicle light 460, whether or not user 422 is located within vehicle 462 and whether or not vehicle 462 is in motion or stationary.

Other embodiments and components may be included in auxiliary vehicle light 460 and in user controller 432. The examples included above are not meant to be limiting.

Turning to FIG. 5, FIG. 5 shows an exemplary embodiment of a user controller, such as user controller 106 in FIG. 1C and user controller 432 in FIG. 4. FIG. 5 illustrates user controller 501, which is a headset that may be worn over an outer ear of a user. User controller 501 includes a top hook 510 located on upper portion 502 of user controller 501 that curves to naturally fit over an outer ear of a user. A lower portion 512 of user controller 501 may be configured to fit behind a lower portion of an outer ear of a user.

User controller 501 is a non-limiting, exemplary embodiment of a user controller that may be adapted to control a position and orientation of an auxiliary vehicle light, such as auxiliary vehicle light 108 in FIG. 1C and auxiliary vehicle light 460 in FIG. 4. While not shown in FIG. 5, in other embodiments, user controller 501 may further include one or more ear buds to assist in a more secure fit and placement of user controller 501. For example, an ear bud may be disposed at a distal end of the top hook 510 and may be adapted to fit into an ear canal of a user. Further, one or more straps (not shown) or additional hooks may be coupled to user controller 501 to secure about a user's neck or head.

User controller 501 may include a number of user input selectors including selectors 506 and 508. Input selectors 506 and 508 are disposed on an outer surface of the housing 504 of user controller 501 and may be configured as one or more input selectors 470 as shown in FIG. 4 and described above. In one or more embodiments, input selectors 506 and 508 may control one or more functions, including an on/off and or center resetting function. Additional input selectors may be included with user controller 501 that may control one or more functions associated with an auxiliary vehicle light (e.g. auxiliary vehicle light 460 in FIG. 4). Further, a port (not shown) may be included that may connected to a charging power source, such as an electrical outlet, in order to charge one or more batteries integrated within a housing 504 of user controller 501.

Figure 6:
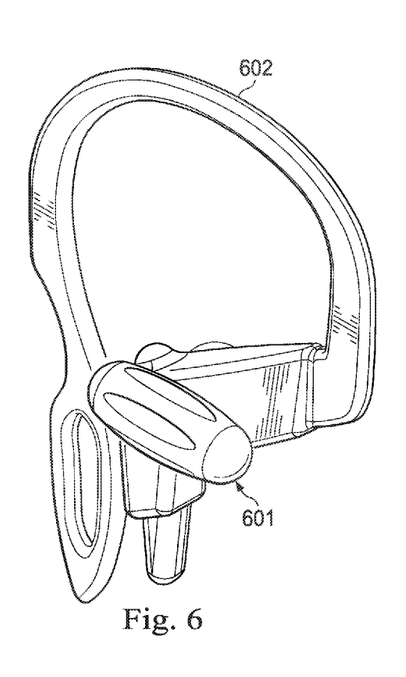
FIG. 6 is an illustration of an exemplary headset that is adapted to operate as a head tracking controller for an auxiliary vehicle light in accordance with an illustrative embodiment.

Turning to FIG. 6, FIG. 6 shows an illustration of another exemplary, non-limiting embodiment for a user controller, such as user controller 106 in and user controller 432 in FIG. 4. In FIG. 6, user controller 601 includes an enclosed, elongated, cylindrical body. One of ordinary skill in the art will understand that other shapes, sizes, and configurations may also be used for user controller 601. It is envisioned that user controller 601 may enclose a set of sensors, such as set of sensors 446, that may be used to communicate a position of a head of a user to an associated auxiliary vehicle light, such as auxiliary vehicle light 460.

In one or more embodiments, user controller 601 may be coupled to a hook, such as hook 602, in order for user controller 601 to be worn as an earpiece over a user's ear. Accordingly, hook 602 may be placed over an outer ear of a user and worn as an earpiece in one or more embodiments. In one or more embodiments, an earbud (not shown) may also be coupled to either hook 602 or user controller 601 so that the ear bud may be fitted into an ear canal of the user and assist in a more comfortable, secure fit of the user controller 601 and hook 602.

Further, in one or more embodiments, one or more input selectors may be located on the outer housing of user controller 601. Such input selectors (not shown in FIG. 6) may include input selectors used to activate (e.g. power on and off) user controller 601. Other selectors may be included on user controller 601, including a selector (not shown) for centering and restoring user controller 601 to a default position (e.g. centered and leveled).

Thus, one or more user controllers, such as user controller 501 and user controller 601, may thus be worn and subsequently removed when needed to control an auxiliary vehicle light.

Figure 7:
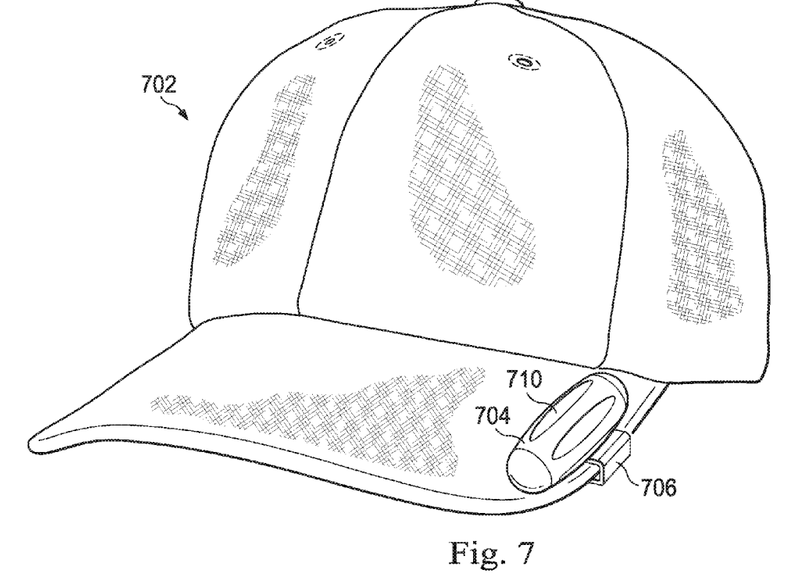
FIG. 7 is an illustration of an exemplary user controller that may be attached to an article of clothing or other item worn on a head of a user in accordance with an illustrative embodiment.
Figure 8:
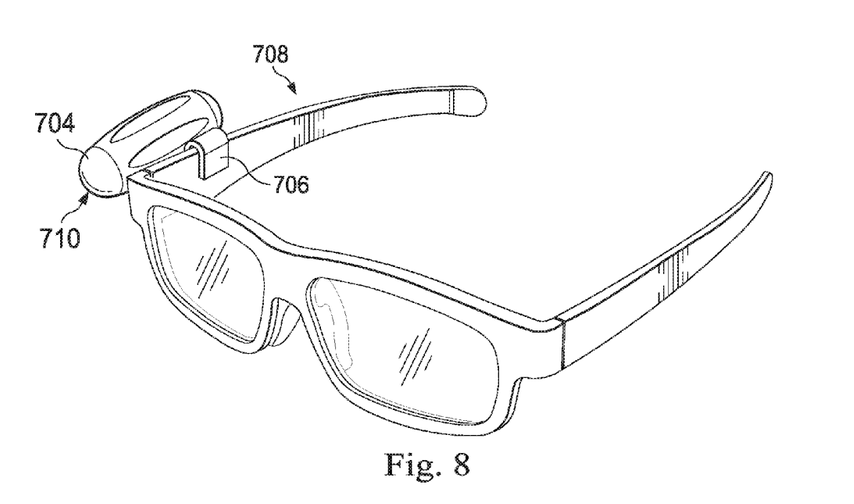
FIG. 8 is an illustration of an exemplary user controller that may be attached to an article of clothing or other item worn on a head of a user in accordance with an illustrative embodiment.

FIG. 7 and FIG. 8 illustrate one or more articles of clothing or accessories that may be worn by a user to which a controller may be coupled. User controller 704, as shown in FIG. 7 and FIG. 8, is an exemplary, non-limiting embodiment of a wearable, user controller for controlling an auxiliary vehicle light, such as user controller 106 and user controller 432 as described above. Accordingly, user controller 704 may track a position and orientation of a user's head.

As shown in FIG. 7, hat 702 may be an example of an article of clothing worn on a user's head that may provide a surface to which user controller 704 may be attached so that the position and orientation of a user's head may be obtained. Alternatively, in one or more embodiments, a helmet or other head covering may be utilized.

As shown in FIG. 8, glasses 708 are an exemplary, non-limiting example of an item or accessory that may be worn on a user's head, and useful for tracking a position and orientation of a user's head. User controller 704 may be connected or attached to either hat 702 or glasses 708 (or other article using an attachment mechanism 706. In one or more embodiments, attachment mechanism 706 may be a clip as known in the art, although other attachment mechanisms may be used.

Attachment mechanism 706 may be removeably or fixedly coupled to a back surface of user controller 706, in one or more embodiments. Attachment mechanism 706 may be connected to hat 702 or glasses 708, and thus controller 706 may be considered to be worn on a head of a user.

Selectors 710 may be any type of selector known in the art, including, but not limited to, buttons, knobs, switches, and may be configured as set of input selectors 470 as described above with respect to FIG. 4 and elsewhere in the present description.

Figure 9A:
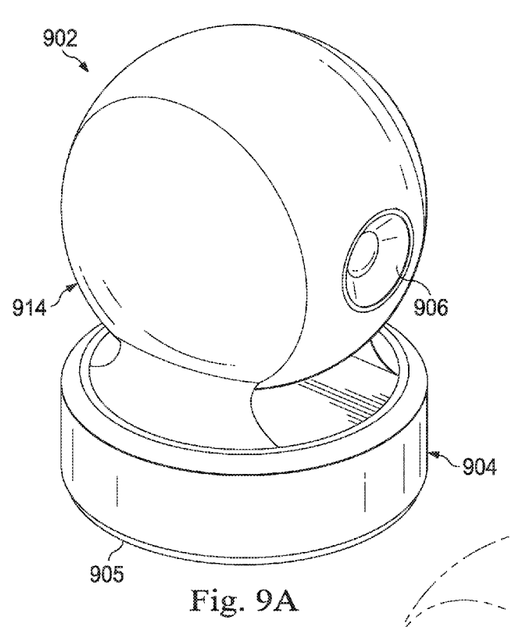
FIG. 9A is a perspective view of an exemplary auxiliary vehicle light in accordance with an illustrative embodiment.

Turning to FIG. 9A, FIG. 9A shows an exemplary, non-limiting example of an auxiliary vehicle light. Auxiliary vehicle light 902 may be similar to an auxiliary vehicle light, as described above with respect to auxiliary vehicle light 108 and auxiliary vehicle light 460. In one or more embodiments, auxiliary vehicle light 902 may include one or more motors configured to pan or tilt (or roll) auxiliary vehicle light 902 about one or more axes. One of ordinary skill may appreciate that auxiliary vehicle light 902 may include one or more additional components not shown in FIG. 9A and FIG. 9B for the purpose of simplifying these Figures.

Auxiliary vehicle light 902 may be coupled to any surface of a vehicle. Auxiliary vehicle light 902 may include a base, such as base 904. In one or more embodiments, the bottom surface 905 of base 904 of auxiliary vehicle light 902 may be coupled to a surface of a vehicle, such as vehicle 102 or vehicle 462, as described above. Any methods or techniques known in the art for fastening or attaching an item to another may be used to couple auxiliary vehicle light 902 to a surface of a vehicle.

Further, auxiliary vehicle light 902 may include a pivotable body 914 configured to rotate about one or more embodiments. In one or more embodiments, pivotable body 914 of auxiliary vehicle light 902 is coupled to base 904. Further, pivotable body 914 may be configured to at least pan and tilt about their respective axes. In addition, pivotable body 914 may be configured to roll in some embodiments. In one or more embodiments, base 904 remains fixed and stationary while pivotable body 914 is configured to at least pan and tilt. Alternatively, in other embodiments, an underside 905 of base 905 may remain fixed, but base 904 may be capable of some rotational movement as well.

Figure 9B:
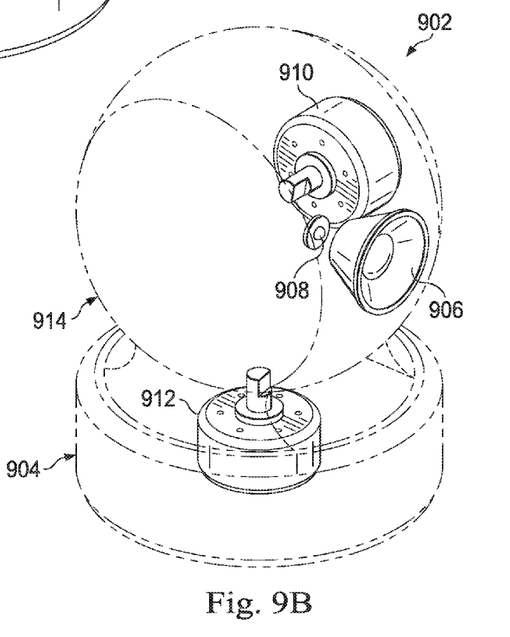
FIG. 9B is a schematic internal view of the exemplary auxiliary vehicle light shown in FIG. 9A in accordance with an illustrative embodiment.

Additionally, auxiliary vehicle light 902 may include one or more lenses 906. As shown in FIG. 9B, lens 906 may be used to reflect light emitted from light source 908, whereby light source 908 is embedded within an interior of auxiliary vehicle light 902. In one or more embodiments, light source 908 may be one or more LEDs, although other types of light sources may be suitable as well.

As shown in FIG. 9B, in one or more embodiments, a horizontal motor 910 may be included within an interior of pivotable body 914 of auxiliary vehicle light 902. Horizontal motor 910 may be a motor used to cause pivotable body 914 to tilt. Thus, horizontal motor 910 may be used to tilt or rotate pivotable body 914 of auxiliary vehicle light 902 about an x-axis. e.g. x-axis 114 with respect to grid 112 as described above. Tilting of auxiliary vehicle light 902 may cause auxiliary vehicle light 902 to be angled at an upward or a downward angle. Accordingly, auxiliary vehicle light 902 may be configured to tilt at an upward or downward angle within a particular range of degrees. Tilting may also refer to pitch, as known in the art.

Further, in one or more embodiments, in addition to horizontal motor 910, vertical motor 912 may also be included within an interior of pivotable body 914. Vertical motor 912 may be a motor used to pan pivotable body 914 of auxiliary vehicle light 902 or rotate pivotable body 914 about a vertical axis over any range of depress as desired. In one or more embodiments, auxiliary vehicle light 902 may be configured to pan 360 degrees about z-axis 118. As known in the art, panning may also be referred to as yaw.

It is noted that any suitable motor may be used as known in the art for horizontal motor 910 and vertical motor 912. Further, one of ordinary skill in the art will understand that auxiliary vehicle light 902 may include other components described above with respect to auxiliary vehicle light 460 in FIG. 4, including, but not limited to, wireless transceiver 406, microcontroller 408, and a camera processing unit 482.

Thus, auxiliary vehicle light 902 may be an example of an auxiliary vehicle light that may be coupled to a vehicle and may be controlled by a user controller configured to track a movement of a user's head, such as user controller 106 and user controller 432 as previously described. Further, one of ordinary skill in the art will appreciate that other shapes and designs other than that shown in FIGS. 9A and 9B may be used for auxiliary vehicle light 902.

Figure 10:
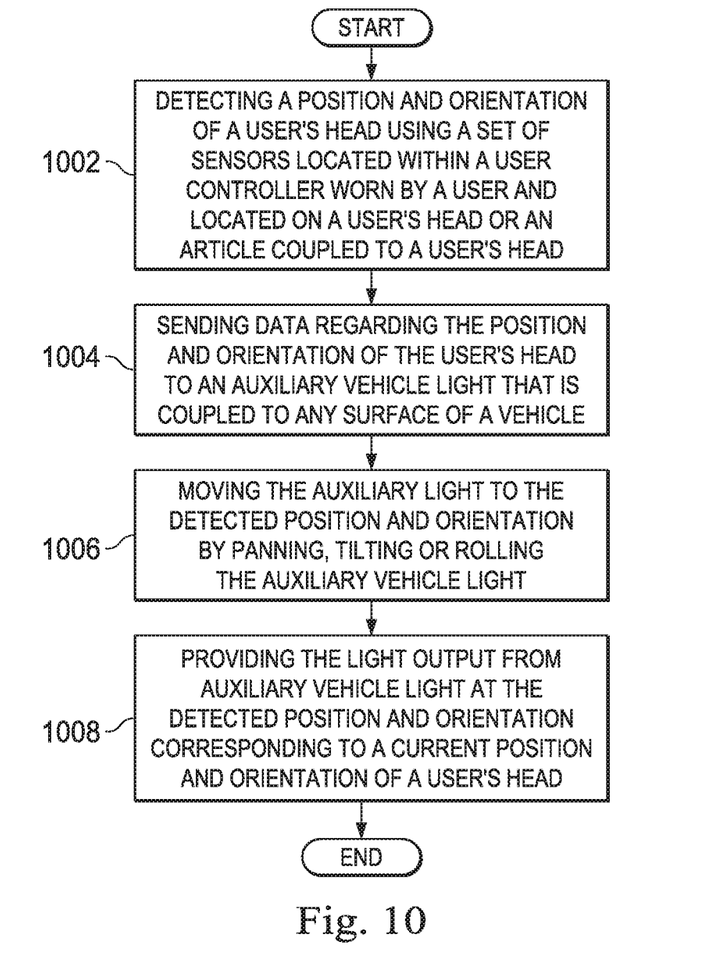
FIG. 10 is a flowchart illustrating an exemplary process for controlling an auxiliary vehicle light in accordance with an illustrative embodiment.

Turning to FIG. 10, FIG. 10 is a flowchart for implementing an exemplary process using one or more embodiments of the present disclosure. The steps included in FIG. 10 may be implemented using a user controller, such as user controller 106 in FIG. 1C, user controller 432 in FIG. 4, user controller 501 in FIG. 5, user controller 602 in FIG. 6, or user controller 704 shown in FIG. 7 and FIG. 8. Further, the process may be implemented by a system, such as system 400 shown in FIG. 4.

The process may begin by detecting a position and orientation of a user's head using a set of sensors located within the user controller, whereby the user controller is worn by a user and located on a user's head or on an article coupled to a user's head (step 1002). Next, data may be sent to an auxiliary vehicle light regarding the position and orientation of the user's head, whereby the auxiliary vehicle light may be coupled to any surface of a vehicle. (step 1004). Before step 1004, data may be compiled and collected by one or more microcontroller units (e.g. microcontroller 444) located within the user controller regarding the position and orientation of the user's head. Upon receiving the data regarding the position and orientation of the user's head, all or a portion of the auxiliary vehicle light (e.g. the body) may be rotated or pivoted to the detected position and orientation. (step 1006). At step 1008, the light output from auxiliary vehicle light may be provided at the detected position and orientation, which may substantially correspond to a current position and orientation of a user's head. The process may continue to verify whether any displacement of user's head from a current detected position has occurred and may repeat steps 1002-1008 as needed.

In addition to the above, the process may include, in one or more embodiments, selectively restoring auxiliary vehicle light to a default position and orientation, by selecting one or more selectors located on a user controller so as to reset the user controller to a default position and orientation. Further, the process may include in one or more embodiments, moving the auxiliary vehicle light by panning, tilting, or rolling the auxiliary vehicle light to the detected position and orientation.

Advantageously, one or more embodiments described herein may provide a control system for controlling a position and orientation of an auxiliary vehicle light that is attached to a surface of a vehicle. The ability to control an auxiliary vehicle light that tracks a movement of a user's head and outputs a set of light beams to a location matching a user's line of sight has not been provided in conventional light modules. A user controller as described herein in one or more embodiments may be easily and conveniently attached using one or more hooks, clips, or other mechanisms to fit over a user's ear or to attach to an item worn by a user's head, such as without limitation, a hat, helmet, or pair of glasses.

Many exemplary non-limiting useful applications have been described herein for such a control system, such as work related applications by one or more emergency personnel, such as police, fire, EMS, law enforcement, and other security responders. Further, one or more embodiments of a control system as described herein may be used in various locations and settings have limited artificial and natural lighting, and may further be utilized in a number of sport (including competition related events), entertainment, personal consumer use, and/or recreational applications.

The flowchart and block diagrams in the figures illustrate the architecture, functionality, and operation of possible implementations of the resonating power transfer system according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations may be made to these embodiments without departing from the broader sprit and scope of the invention as set forth in the claims. It is also understood that other embodiments may be utilized and that logical structural, mechanical, chemical, and/or electrical changes may be made without departing from the spirit or scope of the invention.

What is claimed is:

1. A system for controlling an auxiliary vehicle light, comprising:
an auxiliary vehicle light having a pivotable body capable of pivoting in one or more directions about one or more axes, wherein the auxiliary vehicle light is attachable to a surface of a vehicle, the auxiliary vehicle light comprising:
a set of motors;
a microcontroller;
a transceiver; and
a set of lights disposed with an interior of the auxiliary vehicle light; and
a wearable controller, wherein the wearable controller is adapted to be coupled to a head of a human wearer or adapted to be coupled to an item worn on the head of the human wearer, the wearable controller further comprising:
a set of sensors disposed internally within the wearable controller, wherein the set of sensors are configured to determine an orientation and angular displacement of the head of the human wearer; and
a wireless transceiver that wirelessly transmits data signals from the wearable controller to the auxiliary vehicle light regarding the orientation and the angular displacement of the head of the human wearer,
wherein the auxiliary vehicle light is configured to track a position and the orientation of the head of the human wearer,
wherein the auxiliary vehicle light is configured to pan in a 360 degree direction, and
wherein the auxiliary vehicle light is further configured to tilt over a range of degrees including to tilt up to 180 degrees in relation to the surface of the vehicle.

2. The system of claim 1, wherein the item worn on the head of the human wearer is one of a hat, a helmet, or a pair of glasses.

3. The system of claim 1, wherein the set of lights comprise a set of light emitting diodes.

4. The system of claim 1, wherein the auxiliary vehicle light is adapted to pan, tilt, or roll.

5. The system of claim 1, wherein the wearable controller is configured to be removeably coupled to a pair of glasses, a hat, or a helmet.

6. The system of claim 1, wherein the auxiliary vehicle light is configured to rotate in the 360 degree direction in either a clockwise or a counterclockwise direction.

7. The system of claim 1, wherein the auxiliary vehicle light is coupled to one or more gimbals.

8. The system of claim 1, wherein the set of sensors comprises at least one accelerometer.

9. The system of claim 1, wherein the wearable controller further comprises at least one gyroscope.

10. The system of claim 1, wherein a selector is located on user controller for adjusting a brightness of the light output emitted from auxiliary vehicle light.

11. The system of claim 1, wherein the auxiliary vehicle light further comprises a camera processing unit integrated within the auxiliary vehicle light, wherein the camera processing unit is adapted to provide multimedia data to a user of a surrounding environment of the vehicle.

12. The system of claim 1, wherein the wearable controller is a headset configured to fit over an outer ear of a user.

13. The system of claim 1, wherein the wearable controller includes a center reset selector that is configured to be selected to restore the auxiliary vehicle light to a default position.

14. A method of controlling an auxiliary vehicle light, comprising:
- detecting a position and orientation of a user's head using a set of sensors located within a user controller, wherein the user controller is worn and located on a head of the user or coupled to an article of clothing or accessory worn on the user's head;
- sending the data regarding the position and orientation of the user's head to the auxiliary vehicle light, wherein the auxiliary vehicle light is coupled to a surface of a vehicle;
- upon receiving the data regarding the position and orientation of the user's head, rotating all or a portion of the auxiliary vehicle light to the detected position and orientation, further comprising panning and tilting the auxiliary vehicle light to the detected position and orientation, wherein tilting of the auxiliary vehicle light includes tilting the auxiliary vehicle light over a range including up to 180 degrees in relation to a surface of a vehicle; and
- providing a light output from the auxiliary vehicle light at the detected position and orientation which corresponds to a current position and orientation of the user's head.

15. The method of claim 14, further comprising restricting the tilting angle in a downward direction of the auxiliary vehicle light in relation to the surface of the vehicle.

16. The method of claim 14, further comprising adjusting a brightness of the light output of the auxiliary vehicle light by dimming or enhancing the light output using the user controller.

17. The method of claim 14, further comprising providing live feed of a user's surroundings using a camera integrated within the auxiliary vehicle light.

18. The method of claim 14, further comprising selectively centering and restoring the user controller to a default position.

19. The method of claim 14, further comprising receiving data regarding an angular displacement, angular velocity, or an angular acceleration of the user controller.

20. The method of claim 14, further comprising activating a gimbal mechanism integrated with or coupled to the auxiliary vehicle light in order to rotate the auxiliary vehicle light.

* * * * *